United States Patent

[11] 3,581,617

[72] Inventor John W. Lysobey
Norwalk, Conn.
[21] Appl. No. 705,069
[22] Filed Feb. 13, 1968
[45] Patented June 1, 1971
[73] Assignee Packaging Industries, Inc.
Hyannis, Mass.

[54] ROLLER DIE CUTTING MACHINE OR THE LIKE
15 Claims, 26 Drawing Figs.
[52] U.S. Cl. ................................................ 83/512,
83/547, 83/563, 100/210, 100/211, 100/295
[51] Int. Cl. .................................................. B26d 1/02
[50] Field of Search ......................................... 83/512,
510, 509, 284, 547, 540, 434, 539, 531, 533, 542,
563; 100/162 B, 295, 210, 258, 211; 29/113 AD,
116 AD

[56] References Cited
UNITED STATES PATENTS
| 487,840 | 12/1892 | Kaufman | 83/510 |
| 2,121,003 | 6/1938 | Balfe | 83/510X |
| 2,372,517 | 3/1945 | Richardson | 83/510X |
| 2,732,591 | 1/1956 | Whittum | 100/162(B)UX |
| 2,772,736 | 12/1956 | Campbell | 83/510 |
| 3,213,737 | 10/1965 | Wright | 83/510X |
| 3,237,499 | 3/1966 | Lohrand et al. | 83/510 |
| 3,301,110 | 1/1967 | Stegner | 83/284UX |

FOREIGN PATENTS
| 1,001,590 | 8/1965 | Great Britain | 83/512 |
| 1,446,370 | 6/1966 | France | 83/512 |
| 20,696 | 9/1907 | Great Britain | 83/539 |

Primary Examiner—Frank T. Yost
Attorneys—Kenyon and Kenyon and Reilly, Carr & Chapin ABSTRACT: A roller die cutting machine in which one or more rollers are used to force a work piece and a die into a cutting engagement. A wear plate can be used to force the work piece against the cutting edges of the die in response to the movement of a roller along the wear plate. Where there is a succession of passes of a roller or rollers in engagement with the wear plate, the roller can be caused to apply an incrementally increasing cutting force to the work piece during each successive pass. One of the improvements to the roller die cutting machine is the provision of means to deform the work table upon which the cutting die is disposed in order to accommodate for the deflection of the roller under load and to insure uniform application of force by the roller against the work piece throughout substantially the entire length of the roller. In another improvement the roller is provided with a crowned longitudinal cross section in order that a substantially straight cylindrical form can be maintained at the portion of the roller engaging the wear plate when the roller is under load. The load deflecting the crowned roller causes it to assume a straight cylindrical form. In still another improvement provision is made for raising and lowering the work piece with respect to the path of travel of the roller or rollers and thereby enabling various sizes of dies and thicknesses of work pieces to be accommodated.

INVENTOR.
JOHN. W. LYSOBEY
BY
Kenyon & Kenyon
ATTORNEYS

INVENTOR.
JOHN W. LYSOBEY
BY
Kenyon & Kenyon
ATTORNEYS

ROLLER DIE CUTTING MACHINE OR THE LIKE

BACKGROUND OF THE INVENTION

The invention relates to roller die cutting machines and, in particular, to machines used to cut plastic blisters from a sheet of preformed blister packaging material.

In conventional roller die cutting machines, such as shown in U.S. Pat. No. 3,213,737, issued on Oct. 26, 1965, to David C. Wright, a workpiece which is placed between a cutting plate and a die is cut by a single pass of a roller across the cutting plate. The need to cut the workpiece completely through during a single pass of the roller places undue requirements upon the roller and the die. Thus the cutting is conventionally completed by a single pass of the roller regardless of the type or thickness of the material being cut. When the resistance presented by the workpiece to the roller force is greater than the roller force, the workpiece will not be completely cut by the roller movement. On the other hand, when that resistance of the workpiece to cutting is slightly less than the roller force, the cut made in the workpiece will have undesirable ragged edges.

SUMMARY OF THE INVENTION

It is an object of the invention to provide a work table capable of accommodating the deflection of a roller in a roller die cutting machine.

It is another object of the invention to provide a roller in a roller die cutting machine which is capable of maintaining a substantially cylindrical form in the portion of the roller applying load to the workpiece and die.

It is an additional object of the invention to provide an arrangement for adjustably setting the position of the work table and thereby the die and workpiece with respect to the roller of the machine.

It is a further object of the invention to provide means for incrementally positioning the work table with respect to the roller or rollers of the machine in order to incrementally increase the engagement of the roller with respect to the workpiece and die.

Other objects of the invention and a fuller understanding of the invention are found in the description of the embodiments of the invention and the claims, taken in conjunction with the drawings.

DESCRIPTION OF THE PREFERRED EMBODIMENTS

The roller cutting die machine, constructed in accordance with the invention, can be used to cut sheets of paper, paper board, rubber, leather, cloth, aluminum, steel as well as sheets of plastic. A specific example of use is to cut plastic sheets (FIG. 6) containing a plurality of blisters 25 (FIG. 7) into individual blisters which are used in packaging a variety of products.

Figure 1:
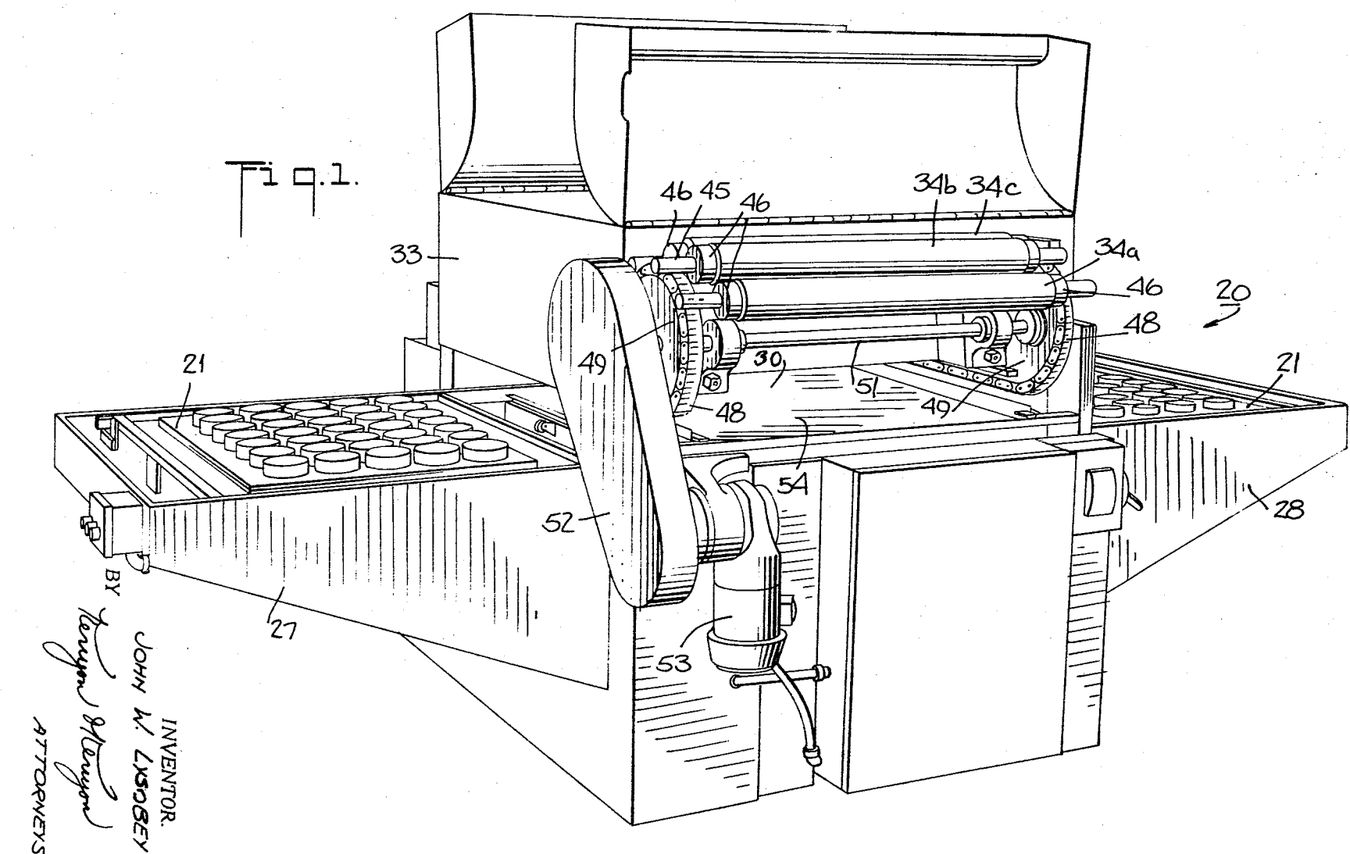
FIG. 1 is a perspective view of a roller die cutting machine constructed in accordance with the invention.
Figure 4:
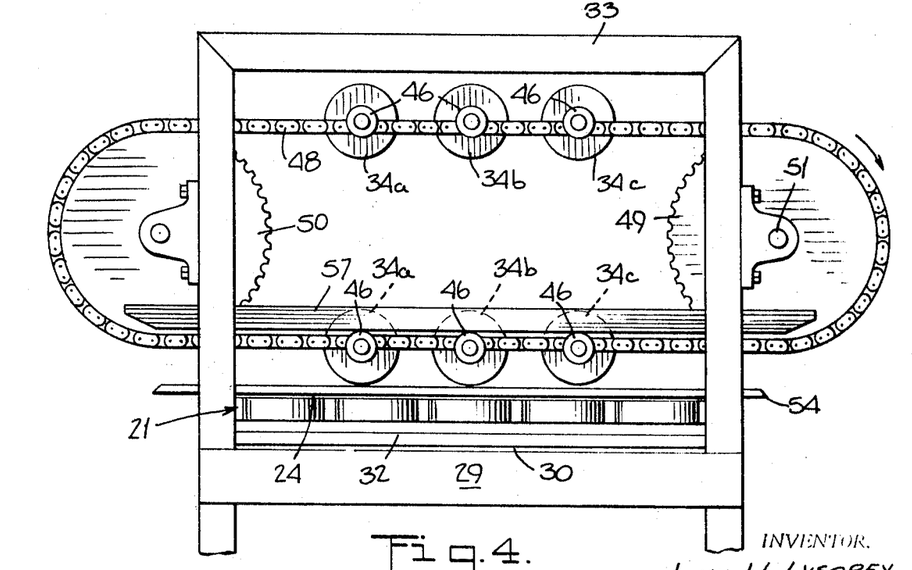
FIG. 4 is a vertical section view of a portion of the machine substantially corresponding to FIG. 3 and showing another height adjustment of the rollers with respect to the bed of the machine.

Referring to FIG. 1, a roller die cutting machine 20 constructed in accordance with the invention includes cutting die assembly 21 which is adapted to be alternately positioned on table 30 mounted upon bed 29 (FIG. 4). The cutting die assembly 21 which includes a plurality of individual dies 22 is alternately fed to the table 30 (FIG. 1) from the sides 27, 28 of the machine. The plurality of dies 22 (FIG. 6) are mounted upon support 21a and extend through sheet 21b which serves to maintain the dies in position. In the alternative, cutting dies 22 can be physically attached to the wear plate 54 (FIG. 2), that is described in more detail below.

The cutting die assembly 21 (FIG. 6) which can be in the form of one or more steel rule dies includes a plurality of knife edges 22a formed from a plurality of hollow metal cylinders. Knife edges 22a can be used for the purpose of cutting blisters 25 from a web of plastic material which contains a plurality of regularly spaced blisters. The radius of the metal cylinders is larger than the radius of blisters 25 if blisters 25 are to have flange 26. It is to be understood, however, that other specific configurations of knife edge 22 can be used when other specific product shapes are desired.

Figures 5, 6, 7, 21:
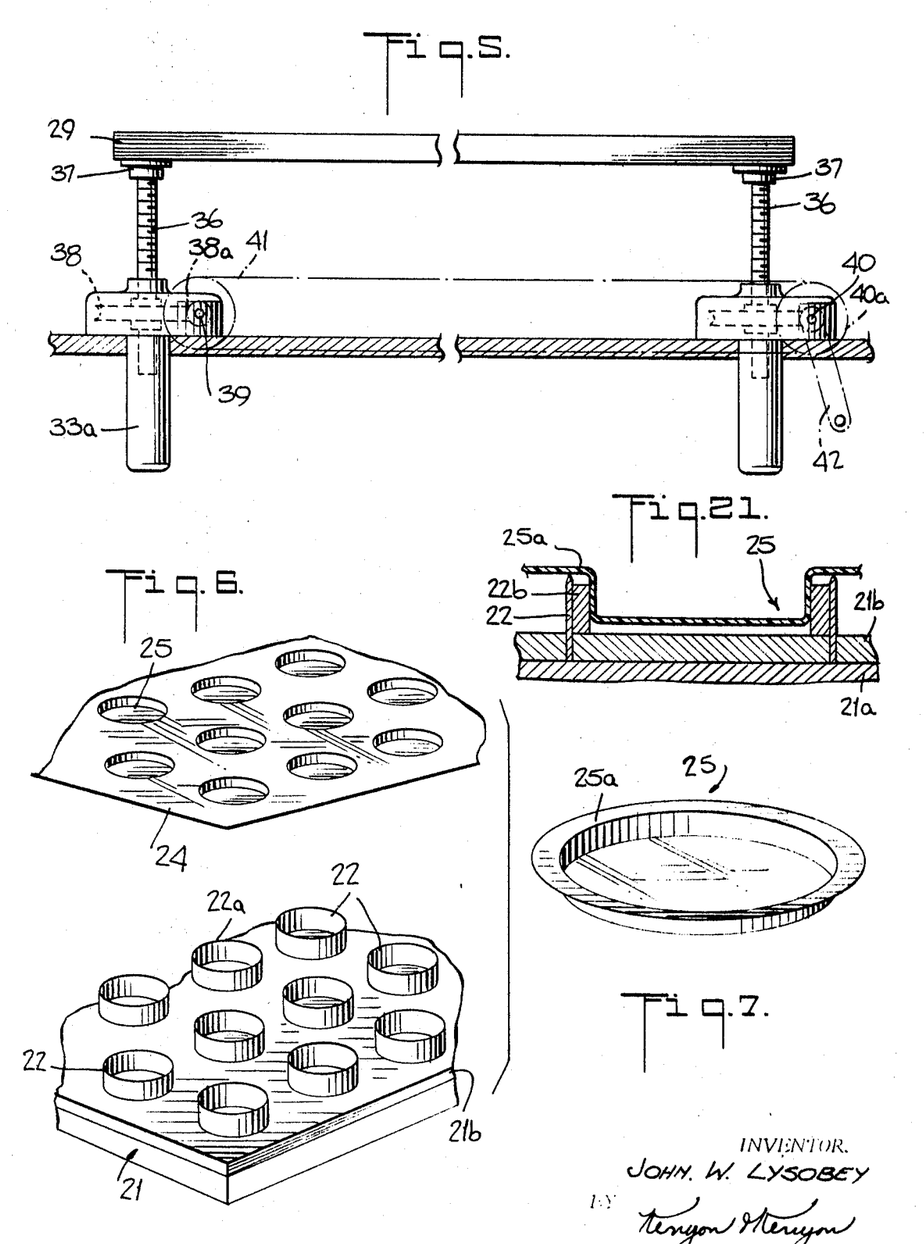
FIG. 5 shows, in schematic form, apparatus for adjusting the height of the cutting table of the machine.
FIG. 6 is a fragmentary perspective view of the cutting die with a workpiece to be cut adjacent thereto.
FIG. 7 is a perspective view of one of the blisters after being cut from a sheet of blisters.
FIG. 21 is a fragmentary vertical section view showing a blister being piloted with respect to a die by an insert within the die.
Figure 8:
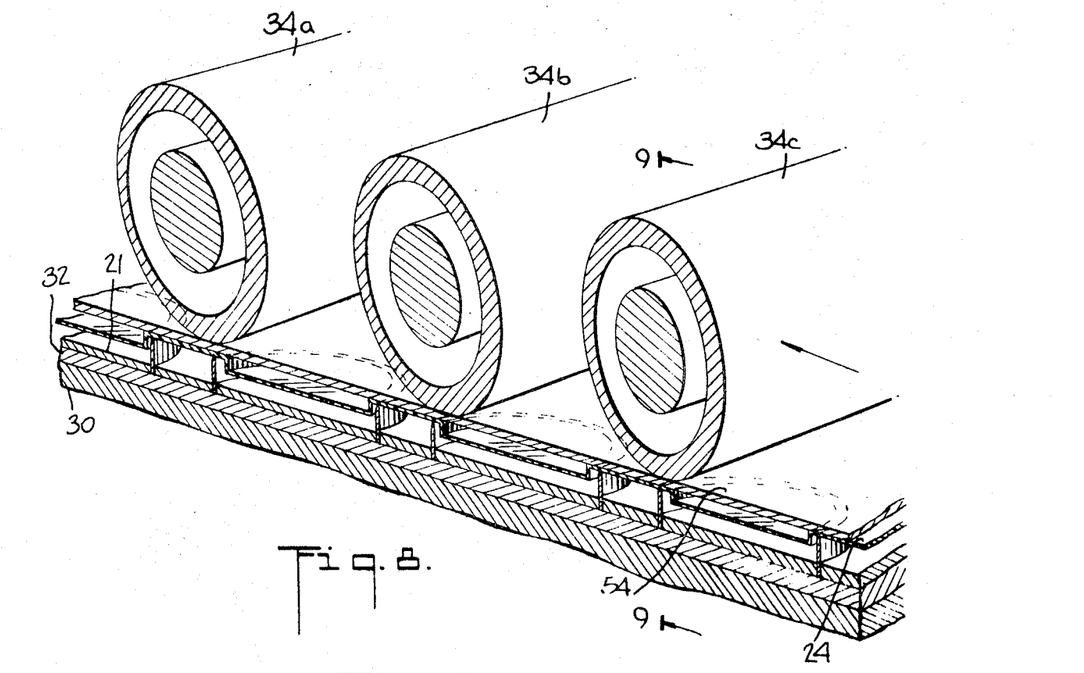
FIG. 8 is a vertical section view of a perspective view showing the cutting rollers being advanced across the cutting die.

As shown in FIG. 21, an insert 22b can be inserted within steel rule die 22. The annular insert is shaped to engage and locate the blister with respect to the die to insure that after cutting the flange 25a is concentric with blister 25. A plurality of inserts can be distributed at a number of locations throughout the die assembly 21.

Figures 2, 26:
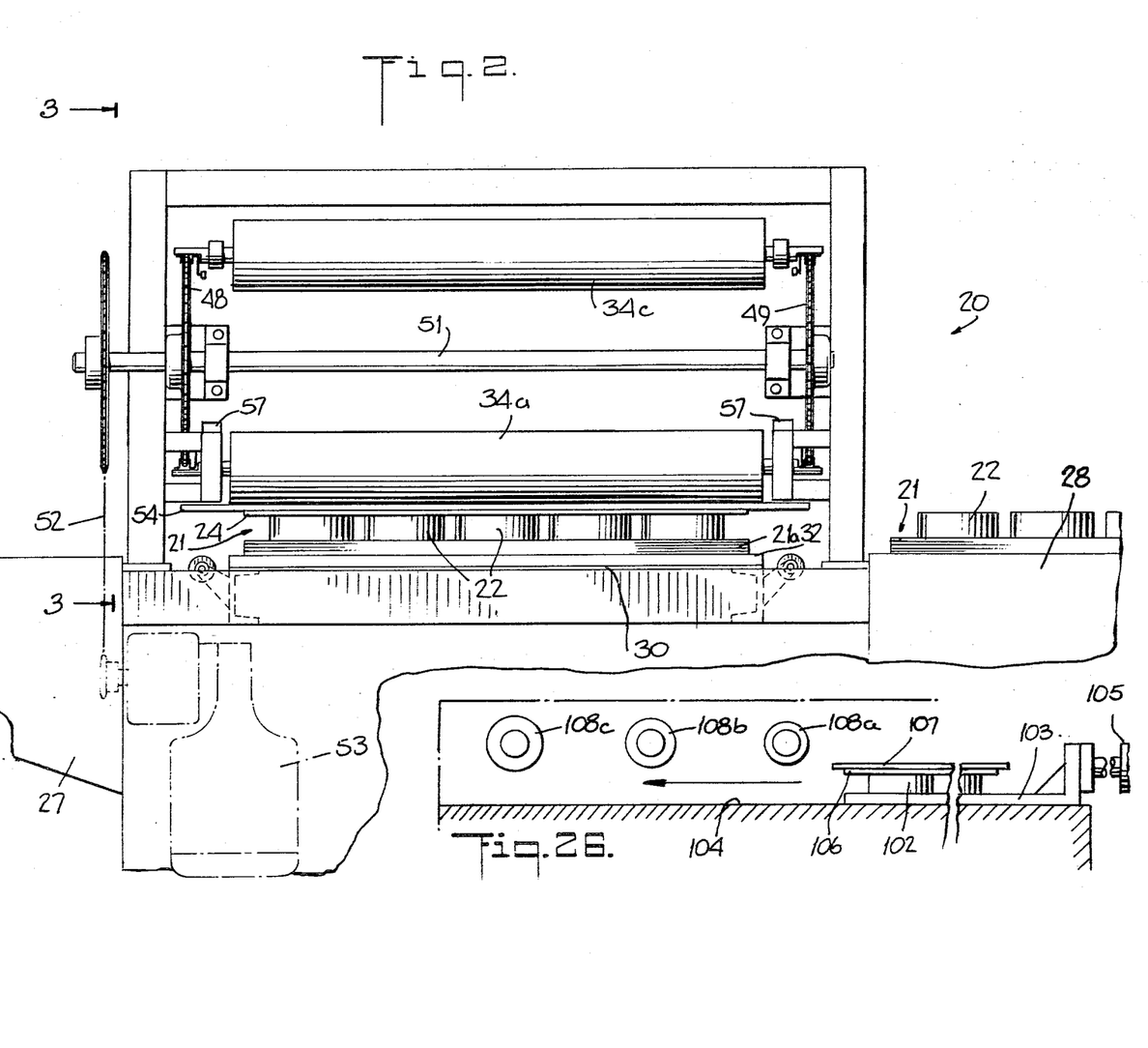
FIG. 2 is a front elevation view of the machine shown in FIG. 1.
FIG. 26 is a fragmentary vertical section view of a machine in accordance with the invention and showing a die and a workpiece thereon which are adapted to be advanced by a ram beneath a plurality of rollers each having an incrementally larger outside diameter.

As shown in FIG. 2, the cutting die assembly 21 which is adapted to receive a workpiece 24 to be cut is positioned upon a flexible hard steel plate 32 overlying table 30. An additional force dampening means 31 (FIG. 3), such as a sheet of hard elastomeric material, for example, butyl rubber, thermoprene, or phenoaldehyde rubber mixtures can be sandwiched between the top of table 30 and the steel plate 32.

FIG. 2 shows wear plate 54 disposed above workpiece 24 which is placed across dies 22. The cutting die assembly is shown disposed upon plate 32 resting on table 30. In operation, the rollers press wear plate 54 downwardly and sever the blisters from the web along the lower surface of the wear plate.

In the alternative, cutting die assembly 21 can be inverted and mounted with respect to the lower surface of wear plate 54 with dies 22 extending downwardly. With such an alternate arrangement, the workpiece is placed on plate 32, underlying the cutting edges of the dies. In this way, plate 32 becomes a cutting surface. When the rollers pass over wear plate 54, the wear plate and the cutting die assembly mounted with respect thereto are urged downwardly to sever the blisters against plate 32.

Figure 17:
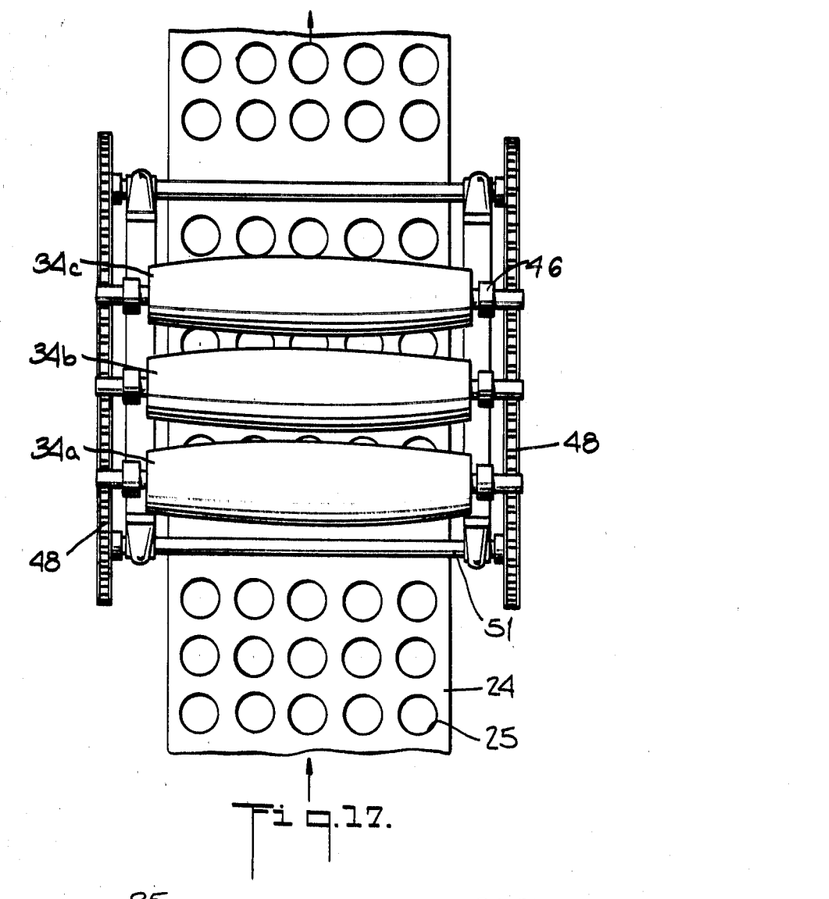
FIG. 17 is a plan view of an embodiment of the machine of the invention in which the blisters are advanced in the same direction during feeding into and during discharge from the machine.

Cutting is accomplished by passing rollers 34a—c across wear plate 54 overlying workpiece 24 positioned on die assembly 21. The rollers urge the wear plate toward the die assembly with incrementally increasing force so that the dies 22 progressively cut the workpiece. prestress In actual operation of the cutting machine, the rollers tend to deflect upwardly at the central portion thereof as the rollers are advanced to apply cutting forces to the workpiece 24. To assist in maintaining the rollers in a cylindrical form under load, the rollers can be crowned, such as illustrated in FIG. 17, thereby having a slightly greater diameter at the middle. Another arrangement for compensating for the deflection of the rollers is the supporting of the cutting table 30 (FIG. 16) at the center by a beam such as I-beam 71 which extends in a direction parallel to the path of movement of the rollers. With a central support, the top of table 30 can deflect as a cantilever at each side of the I-beam and thereby conform to the deflected rollers.

Figures 13, 14, 15, 16:
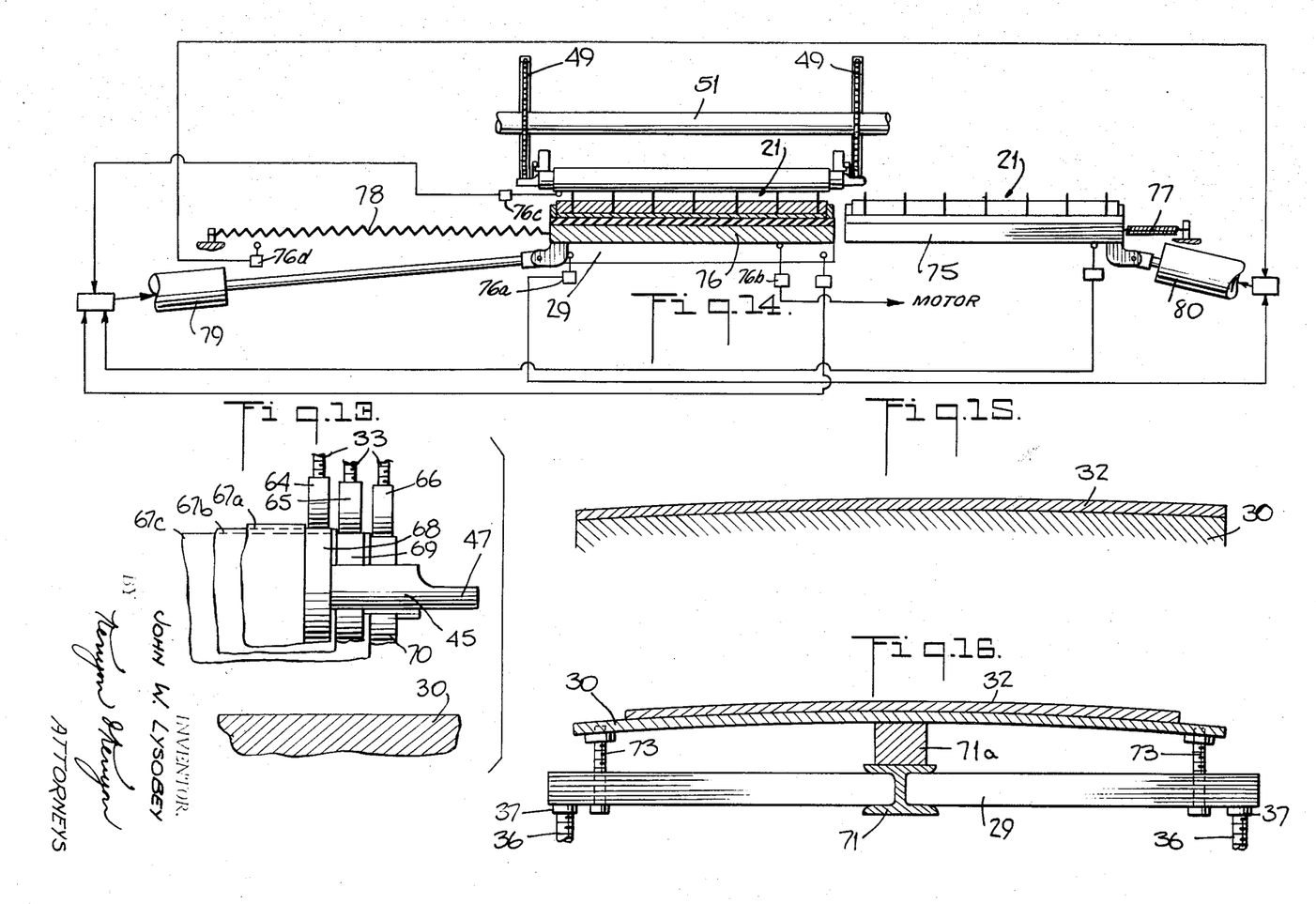
FIG. 13 is a fragmentary front elevation view of the apparatus of FIG. 12.
FIG. 14 is a fragmentary vertical section view of another embodiment of the machine of FIG. 1 which includes means for automatically conveying cutting dies and workpieces to the cutting table of the machine.
FIG. 15 is a fragmentary vertical section view of one embodiment of the invention for compensating the backup plate for the roller deflection that occurs when the rollers move across the wear plate.
FIG. 16 is a fragmentary vertical section view of another embodiment of the invention for compensating for the roller deflection.

A uniform engagement of the length of each roller to the die on table 30 can be obtained by prestressing the table with respect to I-beam 71 located along the centerline thereof. Sufficient prestress is exerted on the cutting table top by means of a series of bolts 73, secured to the longitudinal edges of the table parallel to the path of travel of the rollers, to conform it to the concave bend imparted to the roller. In another embodiment, steel plate 32 (FIG.15) can be prestressed and thereby deflected during fabrication and subsequently welded in order to conform the plate to the concave bend imparted to the rollers.

Figure 19:
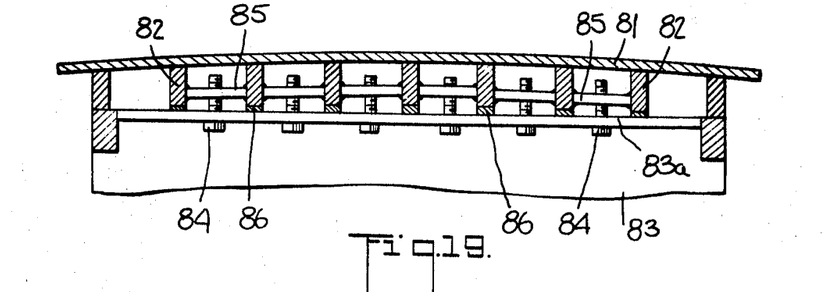
FIG. 19 is a vertical section view showing another embodiment of the invention for deflecting the work table.

Another embodiment of the table is shown in FIG. 19. Table 81 is deflected about a transverse axis extending at substantially right angles to the path of travel of the rollers. Table 81 can also be deflected in the manner shown in FIG. 16. Reinforcing ribs 82 support table 81 with respect to beam 83, such as an I-beam, having flanges 83a. Screws 84 extend through flanges 83a and are threadedly engaged to plates 85 secured to ribs 82. Shims 86 of different thickness are placed between ribs 82 and flange 83a. Thus as screws 84 are tightened, table 81 is deflected toward beam 83 in a manner determined by the selection of the different thickness of shims 86.

Figure 20:
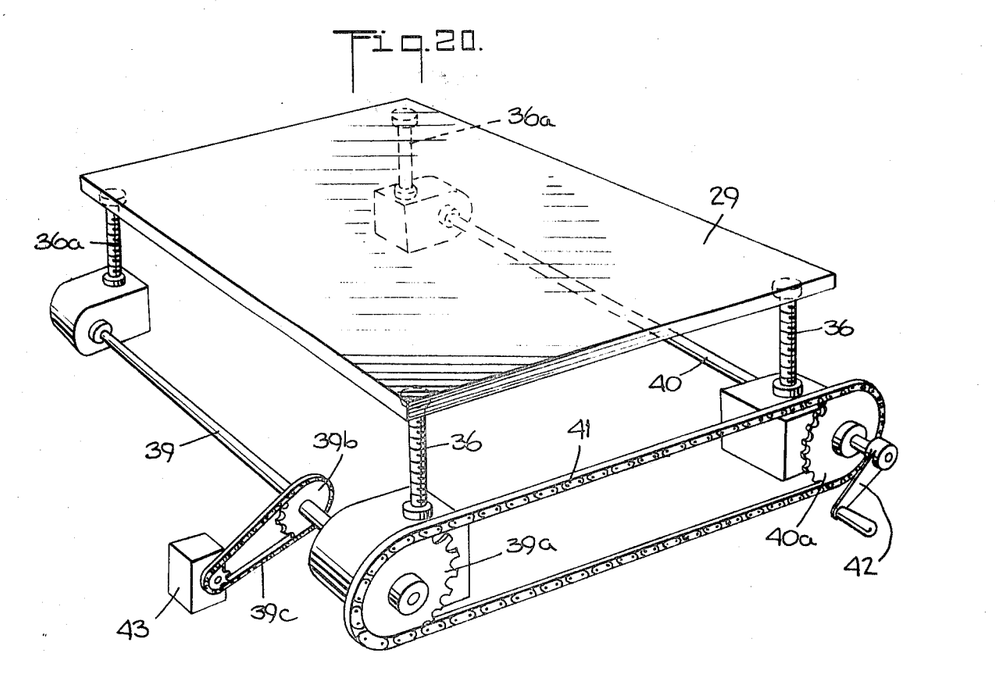
FIG. 20 is a perspective view of the mechanism for raising and lowering the bed of the machine upon which the work table can be mounted.

In order to accommodate dies 22 of different heights, the height of the bed 29 is adjustable with respect to the machine superstructure 33 which includes at least one roller 34 and a means, coacting with the roller, for applying incrementally increasing roller forces to the workpiece 24 to be cut on the die. Referring to FIG. 5, jackscrews 36 extend through threaded holes in sockets 33a mounted in the main frame of the machine. Flanges 37 are pivotally mounted over the upper ends of the screws 36 and attached against the bottom surface of the bed 29. Wheel 38 is threadedly engaged to shaft 36. Worm 38a engaged with wheel 38 is driven by shaft 39. A pair of shafts 39 and 40 drive screws 36 and 36a at each of the corners of table 30 (FIG. 20). Shaft 39 is connected by a sprocket 39a and chain 41 to a shaft 40. Crank 42 drives shaft 39, and shaft 40 through sprocket 40a and chain 41.

As shown in FIG. 20, shafts 39 and 40 also drive screws 36a disposed opposite to screws 36. As a result, the four corners of bed 29 can be simultaneously raised or lowered and therefore the bed can be maintained level during adjustment thereof. A counter mechanism 43 is connected to shaft 39 by sprocket 39b and chain 39c to indicate the extent of adjustment and thereby enable the table 30 to be repositioned to the same level in successive setting operations.

Figure 3:
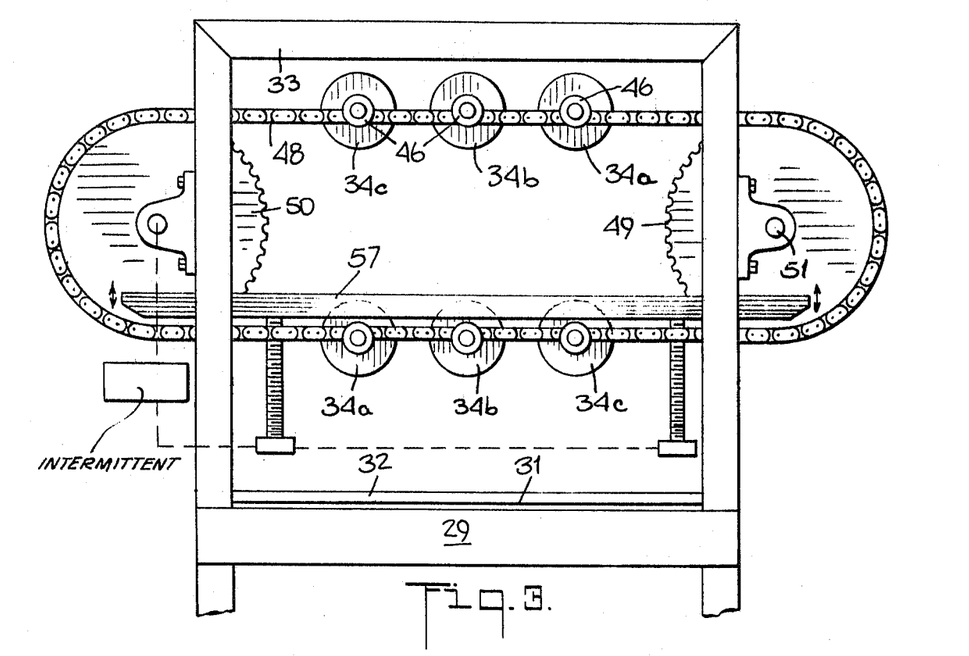
FIG. 3 is a vertical section view of a portion of the machine taken along line 3-3 in FIG. 2 and showing one of the height adjustments for the rollers with respect to the bed of the machine.
Figure 9:
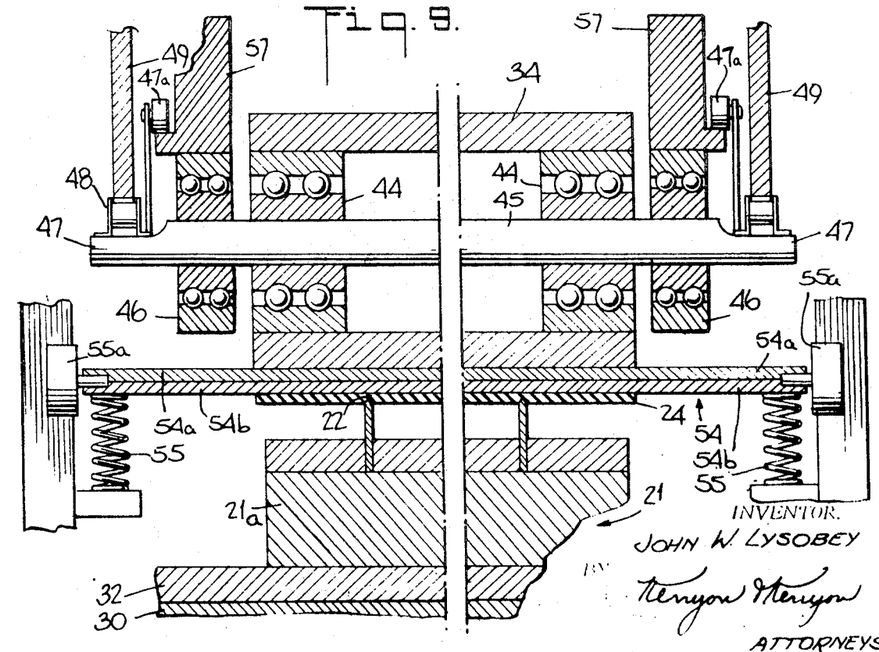
FIG. 9 is a fragmentary vertical section view taken along line 9-9 in FIG. 8 and showing a roller, the wear plate suspended adjacent to the roller, the workpiece, and the cutting die.

The particular superstructure 33 shown in FIG. 1 includes three rollers 34a, 34b, 34c. Each roller (FIG. 9) is mounted on bearings 44 which are supported by shafts 45; a second set of bearings 46 is mounted intermediate roller bearings 44 and the elongated flattened shaft ends 47 and the roller. The shaft ends 47 are attached to endless chains 48 which are driven by driving sprockets 49 and supported by driven sprockets 50 (FIGS. 3 and 4). Sprockets 49 are mounted on a shaft 51 which is connected through a chain drive mechanism 52 to a motor 53 (FIG. 1).

Figure 18:
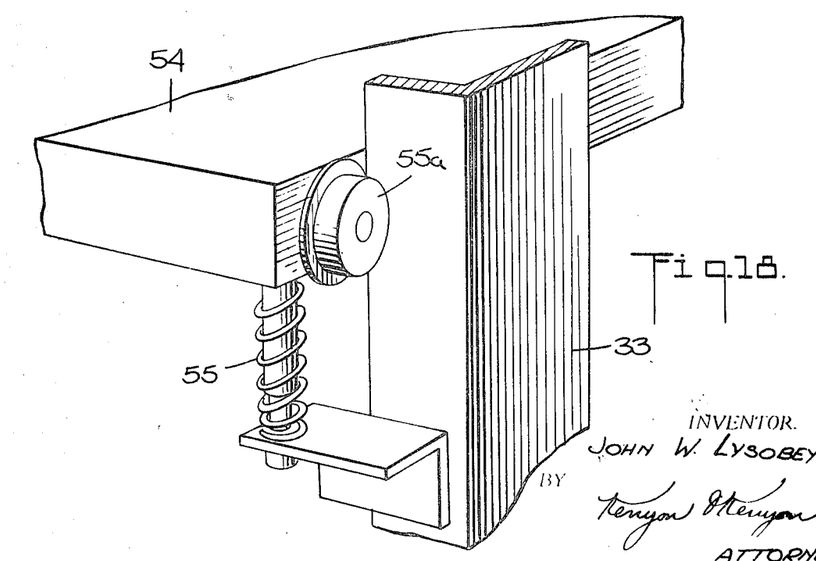
FIG. 18 is a fragmentary perspective view showing a resilient support for the roller wear plate.

A wear plate 54 (FIGS. 9 and 18) is mounted on the superstructure 33 by means of springs 55. Wheels 55a that can roll along the upstanding portions of the superstructure 33 prevent long movement of the wear plate. Alternatively, the wear plate 54 can be suspended by tension springs from the superstructure 33. In either wear plate mounting operation, the wear plate 54 lies in a plane between the rollers and the bed 29 (FIG. 4). The wear plate is suspended by the springs slightly above the plane of the cutting edges of the dies. In this way a clearance is provided between the bottom surface of the wear plate and the dies in order that the dies can be moved in and out beneath the wear plate. When the rollers advance and contact the wear plate, the wear plate is forced against the restraint of the suspending springs and toward the dies. Following the passage of the rollers across the wear plate, the springs elevate the wear plate to its rest position.

Furthermore, the wear plate 54 (FIG. 9) can comprise a sheet of hard steel or a laminated structure comprising a sheet of hard steel 54a secured to sheet 54b of soft metal, for example, aluminum or a plastic material such as polyethylene; the soft metal or plastic sheet 54b does not blunt the cutting edges of the die when that sheet engages the die during the cutting operation; use of the hard steel sheet 54a, that is in engagement with the rollers during the cutting operation, minimizes wearing of the plate 54.

Figure 25:
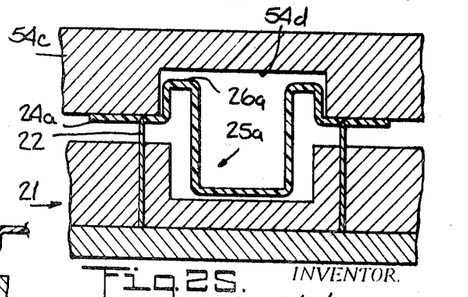
FIG. 25 is a fragmentary vertical section view of a wear plate which has been relieved in order to accommodate a raised portion of the blister which is to be severed from a web.

Furthermore, the planar wear plate 54c (FIG. 25) can be modified to include indentations 54d for receiving portions of the workpiece, during the cutting operation. A wear plate of this design has particular utility when, for example, the blisters 25a to be cut from web 24a have upstanding flange portions 26a that would interfere with a planar wear plate that does not incorporate the aforesaid indentations during the cutting operation.

Figure 10:
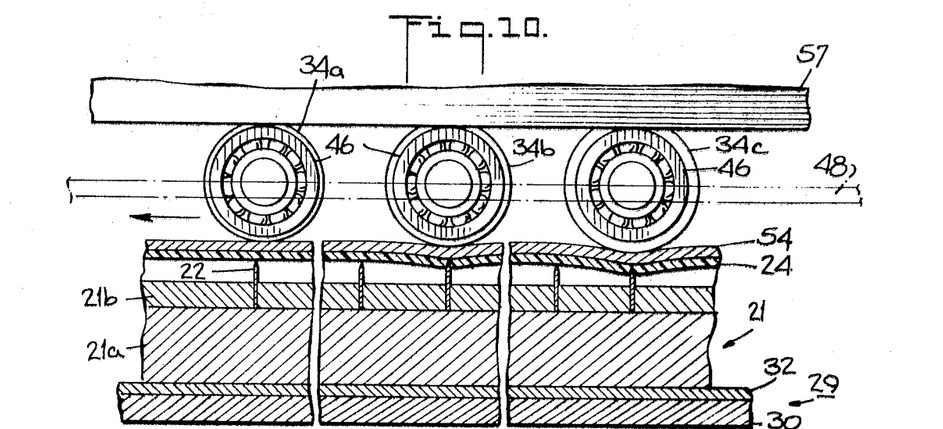
FIG. 10 is a fragmentary vertical section view showing one embodiment of the invention for incrementally increasing the cutting forces applied to the workpiece overlying the cutting die.

In operation of the machine 20 thus far described, one of the cutting dies 21 is moved onto the table 30 with a workpiece 24 disposed upon the die. The table is previously adjusted to position the plane of the cutting edges at a predetermined level with respect to the wear plate and the path of travel of the rollers. Motor 53 is then energized to drive chains 48 thereby driving rollers 34a, 34b and 34c across wear plate 54. During this time bearings 46 roll beneath rails 57 in the arrangement shown in FIG. 10. When an upward reactive force is applied to the rollers by the wear plate, the bearings are urged to roll against rail 57; however, since each of the rollers is provided with a successively larger diameter, the surface of each roller travels in a different horizontal plane. Therefore, each successive roller causes the wear plate to descend into a different horizontal plane with respect to the die. In this way each roller applies an incrementally increasing force through the wear plate 54 to the workpiece 24 to be cut. A complete cut can be made on one pass of the plurality of rollers. If necessary successive passes can be used to cut thicker material. Rollers 47a support shafts 47 (FIG. 9) and thereby rollers 34a—c (FIG. 3) along the lower reaches of chain 48 if the rollers are advanced without the wear plate in place.

Figure 11:
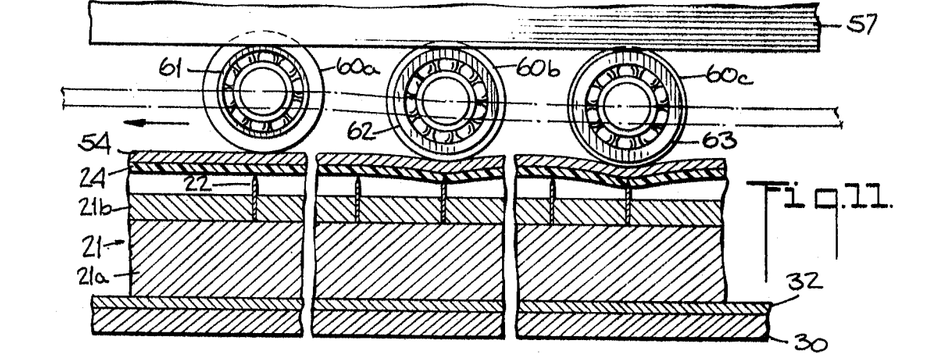
FIG. 11 is a fragmentary vertical section view showing another embodiment of the invention for incrementally increasing the cutting forces applied to the workpiece overlying the cutting die.

Another structure for generating incrementally increasing roller forces is shown in FIG. 11. In this embodiment three equidiameter rollers 60a, 60b, 60c are used. Bearings 61, 62, 63 are mounted on the roller shafts 45 of rollers 60a, 60b, 60c, respectively, intermediate the roller and the shaft end 47. Each of bearings 61, 62, 63 has a successively larger diameter.

The operation of the machine 20, incorporating this embodiment of roller apparatus, is analogous to the machine operation described above. Since bearings 61, 62, 63 are constrained to roll along the lower surface of pressure bars 57 while the workpiece is being cut, each roller 60a, 60b, l 60c applies an incrementally larger force through the wear plate 54 to the workpiece 24 to be cut (FIG. 11).

Figure 12:
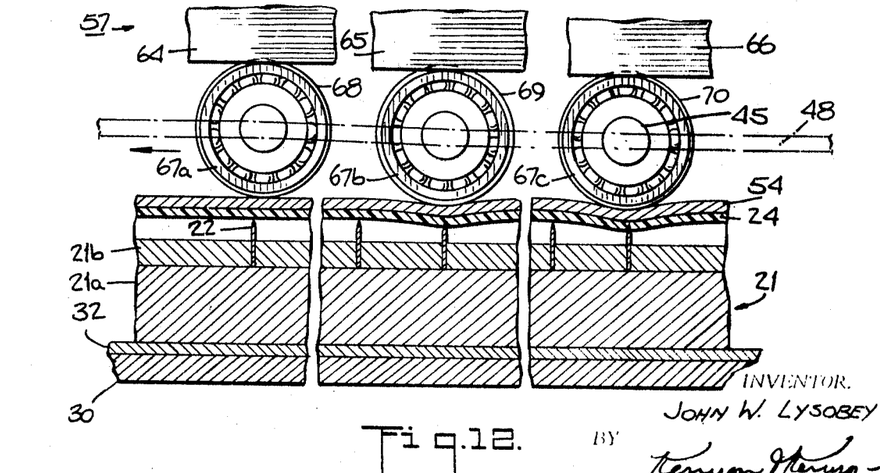
FIG. 12 is a fragmentary vertical section view of the invention for incrementally increasing the cutting forces applied to the work piece overlying the cutting die.

Still another structure for generating incrementally increasing roller forces is shown in FIGS. 12 and 13. In this embodiment of machine 20, the superstructure 33 has assemblies 57 of pressure bars, that is, pressure bars 64, 65, 66, which are spaced laterally and substantially parallel to one another. The pressure bars are positioned progressively closer to the table in correspondence to the order in which the bearings of successive rollers arrive beneath the assembly of bars. In this way each successive roller is positioned closer to the cutting table 30 than the preceding one (FIG. 13). The equidiameter rollers 67a, 67b, 67c and the equidiameter bearings 68, 69, 70 are mounted on shafts 45 which are intermediate the rollers and the shaft ends 47.

The operation of the machine 20, incorporating this embodiment of roller apparatus, is analogous to the machine operation described above. Since the bearings 68, 69, 70 are constrained to roll along the lower surface of pressure bars 64, 65, 66 respectively, when the workpiece 24 is being cut, each roller 67a, 67b, 67c applies an incrementally larger force, through the wear plate 54 to the workpiece.

It is to be understood that, although the specific examples of a means for applying incrementally increasing roller forces to the workpiece 24 to be cut have included three cutting rollers, incremental cutting can be accomplished with a pair of rollers. Thus two cutting rollers can be used in any of the configurations shown in FIGS. 9—13, when it is necessary to develop only one incremental change in roller cutting force magnitude for each movement of the rollers across the wear plate. The use of more than three rollers, in any of the configurations shown in FIGS. 9—13 enables smaller increments, in roller cutting force magnitude to be developed. In addition, wear plate 54 can be omitted to allow the rollers directly to engage the workpiece.

In addition, incrementally increasing roller cutting forces can be developed, according to the invention, with the use of one roller, that makes successive movements across the wear plate. To accomplish incremental applications of varying force to the wear plate by means of an assembly having one roller, it is necessary to utilize one of the three variable elements discussed above, namely for different roller diameters, the different bearing diameters, or the different pressure bar positions.

By way of example, in employing the variable of different pressure bar positions in a machine having but one roller, pressure bars 57 and the supporting portions of superstructure 33 can be mechanically shifted, by means of the movement of cams, gear trains, actuators or similar motion transfer mechanism coupled to the drive shaft of motor 53 or to the chain drive mechanism 52 (FIG. 3). The shift of position would be a predetermined motion or motions which would follow each successive movement of the one roller across the wear plate. Thus the coupling mechanism would lower the pressure bars 57 by a preselected distance for each pass of the roller. As a result, the roller cutting force developed by the next succeeding movement of the roller across the wear plate would be incrementally larger than the force developed by the preceding movement of the same roller across the wear plate.

Thus it can be seen that the roller die cutter of the invention, by virtue of the progressive application of different forces to the wear plate by each of the rollers, enables cutting of the workpiece to be accomplished in one swift pass of the roller assembly over the roller dies. Thus the unique incremental cutting procedures of the invention eliminate difficulties related to the peripheral length of the roller dies' cutting edges and in addition it minimizes the requirements of "make ready."

A further advantage of the roller die cutter of the invention is that at any given time two different shaped dies can be alternately delivered to the table from either side of the machine at the same time. Thus the two-sided shuttle operation enables the production of the machine to be doubled as compared to a conventional roller die cutter.

In addition, the concept of progressive application of different forces to the wear plate can be employed, not only in a roller cutting machine, but also in a machine that makes laminated structures, and in a machine that embosses a variety of materials, as well as a die punch or pressing machine in which the wear plate serves as a male die and the bed serves as a female die.

In particular, each cutting die 21 is placed on a different movable table top 75, 76 (FIG. 14). In FIG. 14 the top at the right in the drawing is held in a rest position at the right side of the machine under the restraining force of spring 77. An air actuated piston 79 is actuated to move table top 76 from the left side of the machine on to the bed 29. In this position, the table top 76 actuates a switch 76a which locks out the air actuated piston 80 connected to table top 75, thereby preventing movement of table top 75, until table top 76 is removed from the bed 29.

At the same time that the lockout switch is operated, the table top 76 also actuates a switch 76b to energize motor 53, thereby driving the rollers to cut the workpiece positioned on the die.

When the roller movement is completed, motor 53 is deenergized and another switch 76c is actuated by the arrival of the rollers at their rest position to release the lock on piston 79. At the same time, table 76 is restored to its rest position by spring 78, thereby actuating a switch 76d to enable the operation of piston 80. At this time, either piston 79, 80 can be actuated, however, as described above, actuation of one piston automatically prevents activation of the other piston. The operation of piston 80 and the switches related thereto are similar to the operation and switches of piston 79.

As a result of this automatic shuttle feed operation, combined especially with incrementally cutting, twice the average daily production, that can be obtained on a conventional roller die cutting machine, can be obtained on a machine constructed in accordance with the invention. Of course, when a high rate of production is not required, a single table top operating from one side of the machine can be used.

Another arrangement is shown in FIG. 17 for increasing production. Here the web 24 of blisters 25 is moved along the line of travel of rollers 34a—c rather than at right angles as in the machine 20 of FIG. 1. As shown in FIG. 17, the web advances in the same direction as that of the lower reach of the rollers where the cutting operation is performed. With this arrangement, the need of reciprocating feeding and withdrawing motions is eliminated.

Figure 22:
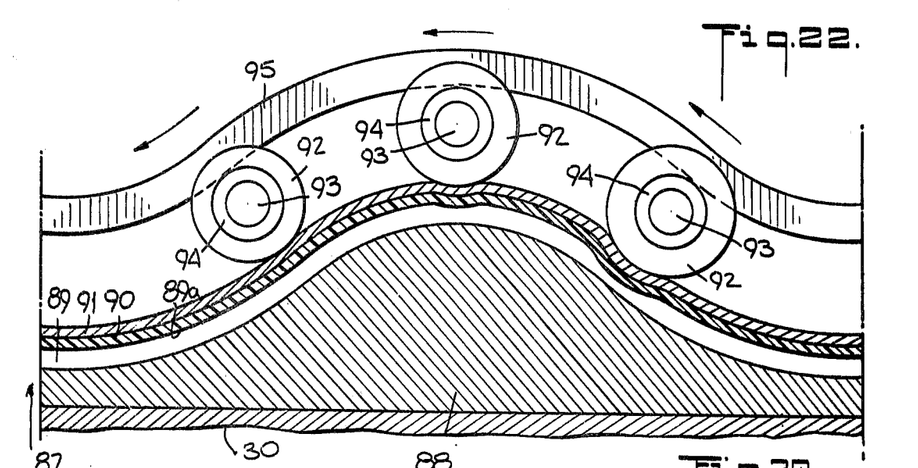
FIG. 22 is a fragmentary vertical section view showing a die cutting assembly having a contoured cutting edge, and an arrangement of rollers for applying cutting pressure to the edge.

Cutting die assembly 21, as shown in FIG. 6, includes a plurality of dies 22 which have cutting edges 22a disposed in a substantially common flat plane. With such a die assembly, the workpiece 24 is subjected to a plurality of cuts disposed in a common flat plane overlying the plane in which the cutting edges are disposed. FIG. 22 shows cutting die assembly 87, which is adapted to produce cuts which extend in a three-dimensional manner as compared to a planar arrangement of cuts. The die assembly which is adapted to be mounted upon table 30 overlying bed 29 of machine 20 includes support 88 in which dies 89 are mounted. Cutting edges 89a of the dies extend upwardly as shown in FIG. 22. Workpiece 90 overlies cutting edges 89a. Wear plate 91 which is contoured to mate with the contour of cutting edges 89a, is placed over workpiece 90.

Rollers 92 serve as the means for applying progressively increasing pressure to wear plate 91. The rollers can be urged toward the wear plate and made to apply an incrementally increasing pressure thereto by any of the arrangements previously shown for machine at 20. As shown in FIG. 22, the rollers are mounted upon shafts 93 which carry outboard bearings 94. Track 95 is shaped to correspond to the contour of cutting edges 89a and the wear plate 91.

Rollers 92 are advanced in the direction of the arrows shown in FIG. 22. The leading roller has the minimum outside diameter and the trailing roller has the maximum outside diameter. As the rollers are advanced, they urge wear plate 91 with progressively increasing force against wear plate 91, so that workpiece 90 is progressively cut by cutting edges 89a.

Figure 23:
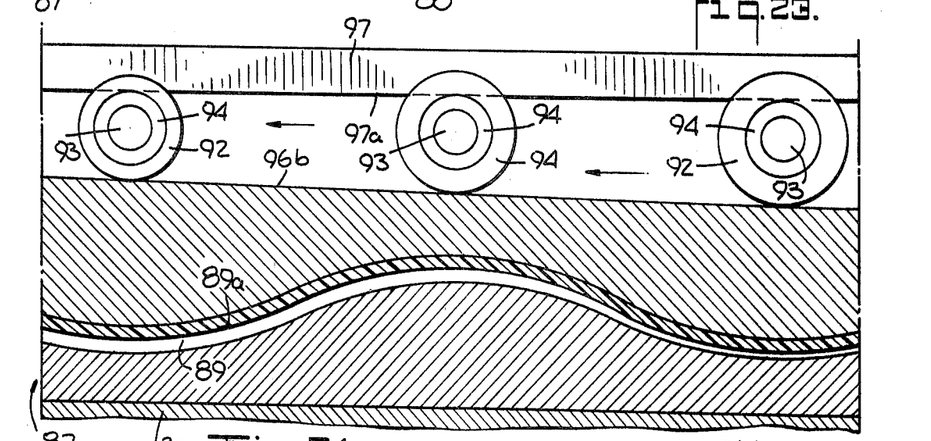
FIG. 23 is a fragmentary vertical section view of a contoured cutting die and a flat work plate for apply roller pressure to a die.

In the arrangement shown in FIG. 23, die assembly 87 having contoured cutting edges 89a and a contoured work plate 91 is employed; however, the working surface is formed by the lower surface 96a of work plate 96. Thus the lower surface, surface 96a, of plate 96 is formed to mate with the contour of cutting edges 89a. Upper surface 96b of plate 96 serves as the wear surface along which rollers 92 operate. The rollers which move in the direction of the arrows in FIG. 23 have progressively increasing diameters. The rollers are urged with incrementally increasing forces against surface 96b by the engagement of bearings 94 with track 97 which has flat surface 97a in engagement with the bearings. With the arrangement of FIG. 23, the drive to the rollers is simplified since the rollers operate in substantially a common plane.

Figure 24:
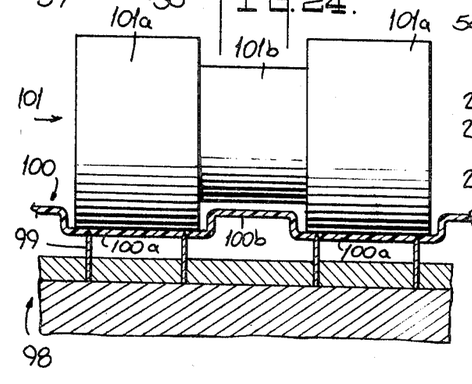
FIG. 24 is a fragmentary vertical section view of a stepped roller for applying pressure to a workpiece disposed upon a cutting die.

FIG. 24 shows die cutting assembly 98 having dies 99. Workpiece 100 is placed over the dies. Between areas 100a of the workpiece which are to be cut out by dies 89, there is disposed areas 100b which extend above the plane in which areas 100a extend. In order to limit the cutting action to areas 100a, and at the same time to clear areas 100b, the rollers for applying an incrementally increasing pressure to the workpiece, namely rollers 101, are provided with a work portion 101a of one diameter and a necked-down portion 101b of a smaller diameter. The necked arrangement can be repeated along the length of the roller and the diameters can be varied along the length of the roller. With the construction of FIG. 24, a great variety of workpieces and die configurations can be accommodated while utilizing the procedure of progressively cutting workpiece against the die by the application of pressure to a workpiece from a plurality of rollers. It should be noted that with the construction shown in FIG. 24, a wear plate can be disposed between roller 101 and workpiece 100 as shown in the various other embodiments of the invention.

In the embodiments of the invention shown in FIGS. 1, 3, 4 and 9, rollers 34a—c are advanced by chain 48 to pass with respect to workpiece 24 in order to cut the workpiece incrementally upon dies 21. Each successive roller has its surface travelling in a path of travel which is closer to the die as compared to the preceding roller. As a result each successive roller can provide an increasing degree of engagement between the surface of the roller and the workpiece or the wear plate if one is used. As shown in FIG. 26, dies 102 are mounted upon carriage 103 which is adapted to be transported along supporting surface 104 by linear actuator or ram 105. Workpiece 106 is placed in an overlying relationship with respect to dies 102. Depending upon the nature of the workpiece and the form of dies 102, it may be desirous to employ wear plate 107 overlying the workpiece placed upon the dies.

Rollers 108a—c are each adapted to provide an incrementally increasing degree of engagement with the passage of wear plate 107 or workpiece 106 disposed upon dies 102 as they are advanced beneath rollers 108a—c. As shown in FIG. 26, each successive roller of rollers 108a—c has an increasingly larger diameter and therefore each successive roller provides a greater degree of engagement with wear plate 107 when carriage 103 is advanced to the left as viewed in FIG. 26 by linear actuator 105. As has been previously discussed, instead of rollers with increasing diameters, the positioning of rollers 108a—c with respect to the path of travel of wear plate 107 can be relied upon in providing an incrementally increasing degree of engagement.

It is to be further understood that although specific embodiments of the invention have been described and shown, variations in structural detail within the scope of the appended claims are possible and are contemplated. There is no intention, therefore, of limitation to the exact abstract or disclosure herein presented.

What I claim is:

1. A machine adapted for roller die cutting comprising:
   a. a table adapted to receive thereon a cutting die having exposed knife edges, the cutting die being adapted to receive a workpiece to be cut;
   b. means including at least one roller for applying cutting forces to a workpiece when positioned on the knife edges;
   c. means for advancing said roller across the exposed knife edges of the cutting die; and
   d. means for deforming said table to compensate for the deflection of said roller when said roller advances across the cutting die.

2. A machine in accordance with claim 1 in which said means for deforming said table to compensate for the deflection of said roller when said roller advances across the cutting die deforms said table in a symmetrical manner about an axis that is parallel to the direction in which said roller advances across the parallel plane.

3. A machine in accordance with claim 2 in which said deforming means includes a rigid beam positioned under said table, and means for moving said beam against said table, thereby deforming said table about the axis.

4. A machine in accordance with claim 2 in which said deforming means comprises:
   a. a plurality of ribs attached to the bottom surface of said table and extending in the direction of travel of said roller and spaced apart from one another;
   b. a supporting member underlying said ribs;
   c. means for selectively spacing said ribs with respect to said supporting member, the spacing decreasing outwardly from the central portion of said supporting member; and
   d. means for deflecting said table toward said supporting member until said spacing means abuts said supporting member, whereby said table can be selectively deformed.

5. A machine in accordance with claim 1 additionally including:
   a. first and second means for supplying cutting dies to said table; and
   b. means for activating the first and second supplying means; the combination of the activating means and the first and second supplying means being conditioned to enable the activation of one of said supplying means to prevent the activation of the other of said supplying means.

6. A machine in accordance with claim 1 wherein said table includes a member for positioning a cutting die with respect to said means for applying cutting forces, and means for moving said member relative to said means for applying cutting forces.

7. A machine in accordance with claim 1 additionally including a wear plate positioned between said cutting die and said means for applying forces, said roller being adapted to advance across said wear plate, thereby to apply cutting forces through said wear plate to a workpiece positioned on the cutting die.

8. A machine in accordance with claim 7 wherein said wear plate comprises a first portion adjacent to said means for applying cutting forces and a second portion adapted to be adjacent to the cutting die, said first portion consisting essentially of a material substantially harder than the material incorporated in said second portion.

9. A roller die cutting machine comprising:
 a. a table for supporting a cutting die having exposed knife edges;
 b. means for moving said table relative to the frame of the machine;
 c. compression spring means for suspending a wear plate from the frame of the machine in a position overlying the exposed knife edges of the cutting die; and
 d. means for applying incrementally increasing cutting forces through the wear plate to a workpiece when on the knife edges, said force applying means including
  i. a pressure bar;
  ii. first, second and the third rollers being adapted to advance sequentially along the wear plate;
  iii. bearing means rotatably mounted at the end of each roller for movement on said pressure bar when said rollers move across the wear plate, said pressure bar and said bearing means during each sequential advance of said rollers across the wear plate causing the cutting force developed by the third roller to be incrementally larger than the cutting force developed by the second roller, the cutting force developed by the latter being incrementally larger than the cutting force developed by the first roller.

10. A roller die cutting machine in accordance with claim 9 wherein the diameter of said third roller is larger than the diameter of said second roller, the diameter of the latter being larger than the diameter of said first roller.

11. A roller die cutting machine according to claim 9 wherein the diameter of the bearing means rotatably mounted at the end of the third roller is larger than the diameter of the bearing means mounted on the second roller, the diameter of the latter bearing means being larger than the diameter of the bearing means mounted on the first roller.

12. A roller die cutting machine comprising:
 a. a cutting die having exposed knife edges disposed substantially in a common cutting plane;
 b. a wear plate movable into registration with a workpiece positioned on said knife edges, as well as for applying incrementally increasing forces through the wear plate to the workpiece, thereby to cut the workpiece of said knife edges, said moving and force applying means including at least one roller adapted to advance along the wear plate, the area of contact between said roller and the wear plate moving in a plane substantially parallel to the cutting plane; and
 c. means in synchronism with each pass of said roller along said wear plate for adjusting the separation between the plane of contact of said roller and said wear plate and the common cutting plane thereby to apply incrementally increasing roller cutting forces to the workpiece during each successive movement of the moving and force applying means across the wear plate.

13. A roller die cutting machine in accordance with claim 12 in which the plane of contact between said roller and the wear plate is different from and substantially parallel to the cutting plane and in which said separation adjustment means adjusts the separation between the plane of contact and the cutting plane to apply incrementally increasing roller cutting forces through the wear plate to the workpiece.

14. A machine for applying force to a workpiece comprising:
 a. means for supporting a workpiece,
 b. means for applying a force to the workpiece which includes rolling a roller means along a predetermined path overlying said supporting means and with respect to a workpiece positioned upon said supporting means to apply force to the workpiece, and
 c. means in synchronism with the movement of said rolling means for incrementally reducing the interval between said supporting means and the predetermined path of said roller means to incrementally increase the engagement of said roller means and incrementally increase the force to be applied by said roller means to the workpiece for successive movements of said rolling means along the predetermined path.

15. A machine adapted for roller die cutting comprising:
 a. a table;
 b. a cutting die mounted to said table and having exposed knife edges, said cutting die being adapted to receive a workpiece to be cut;
 c. means including at least one roller for applying cutting forces to the workpiece when positioned on said knife edges, said roller means being crowned to provide the largest outside diameter at the central portion thereof with the outside diameter tapering toward each of the outer end portions of said roller, whereby the crowning of said roller means enables the portion of the surface of said crowned roller means subjected to load to assume a substantially straight cylindrical form in response to the deflection of said crowned roller means in response to the load applied to said portion; and
 d. means for advancing said roller across the exposed knife edges of said cutting die.

UNITED STATES PATENT OFFICE
CERTIFICATE OF CORRECTION

Patent No. 3,581,617  Dated June 1, 1971

Inventor(s) John W. Lysobey

It is certified that error appears in the above-identified patent and that said Letters Patent are hereby corrected as shown below:

Column 2, line 41, "apply" should be -- applying --

Column 3, line 44, after "workpiece." delete -- prestress --

Column 5, line 32, after "60b," delete -- 1 --

Signed and sealed this 9th day of November 1971.

(SEAL)
Attest:

EDWARD M. FLETCHER, JR.
Attesting Officer

ROBERT GOTTSCHALK
Acting Commissioner of Patents